S. JUNE.
Straining Covers for Milk-Pails.
No. 224,699. Patented Feb. 17, 1880.
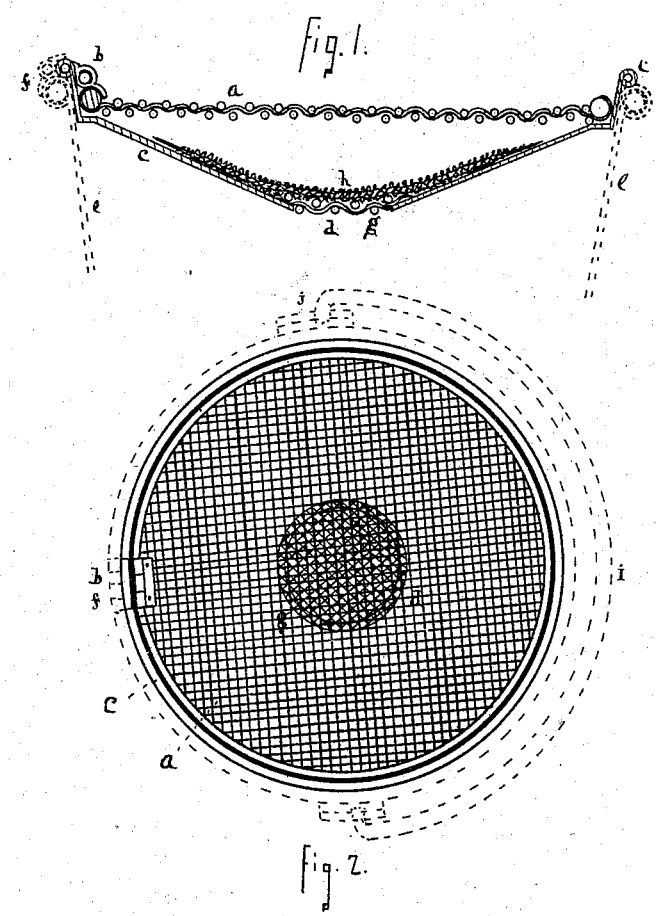

UNITED STATES PATENT OFFICE.

SOLOMON JUNE, OF ITHACA, NEW YORK, ASSIGNOR OF ONE-THIRD OF HIS RIGHT TO SILAS G. ELLIOTT, OF SAME PLACE.

STRAINING-COVER FOR MILK-PAILS.

SPECIFICATION forming part of Letters Patent No. 224,699, dated February 17, 1880.

Application filed August 12, 1879.

*To all whom it may concern:*

Be it known that I, SOLOMON JUNE, of Ithaca, Tompkins county, New York, have invented an Improved Filter or Straining-Cover for Milk-Pails, of which the following is a specification.

My device consists of a concave sheet-metal cover, which extends over or covers the top of a milk-pail, and is used while milking, not after the milking is done. This cover has a central aperture, over which is put a fine wire-netting. Upon this concave cover lies loosely a cloth, which is the second part of my device. The object of its lying loosely is that the milk shall cause it to fold or bundle itself, when wet with milk, over the aperture in the cover; or it is thus sagged or folded by hand over the aperture, so as to act as a sopping-cloth, and thus in a better manner gather on itself the impurities of milking. An inch or two above the cloth thus lying loose over this aperture is a sieve-like top-cover, which is not designed to act as a strainer, but whose object is to prevent spattering of the milk. These several parts will be apparent as I describe them.

Figure 1 is a sectional elevation of my device, and Fig. 2 is a view looking down on the same.

In the figures, *a* is a horizontal top-cover, made of wire-netting, the full, or nearly so, size of the top of the pail, and its use is to catch and return down on the concave cover any milk that may spatter up from the cloth or from the concave cover itself. For this top-cover experiment has shown that wire-netting of fine wire, with meshes about an eighth of an inch in diameter, allows the streams of milk from the teats of the cow to go easily through it and prevents the rebound or spattering of the milk. It acts not as a strainer, though it may catch and hold large pieces or particles of impurities on it. This wire-net cover is held by a metallic band, and lies just within the elevated edge of the concave cover, as shown in the figures, and is hinged at *b* to the concave cover.

The concave or funnel-shaped sheet-metal cover is indicated by the letter *c*, and is the main cover of the pail, as shown. It is removable at pleasure, and its relative depth is shown to be small, and to occupy a small portion of the pail. At its center is an aperture, *d*, closed by a fine wire-netting, *g*, with small meshes. This wire-netting acts as a strainer, though its main object is to support the more peculiar part of my device, which is the loose straining-cloth laid on the concave cover and over the aperture *d*. The figures show the various parts of the concave cover, that it is plain, covers the whole top of the pail, and has a slight concavity. On the concave cover lies the cloth *h* over the aperture and netting, as has been just said, and extends well up the inside of the concave cover toward its edges. It lies loosely, in order that when the milk falls on it it may settle down or be corrugated over the aperture *d* and beyond it on all sides in a lumpy or dish-cloth-like manner, and act not as a stretched-cloth strainer, simply by having the milk go through it transversely to the threads of the cloth, but by the milk going longitudinally through the fibers of the cloth, thus sopping up or holding up the dust and impurities of the milking process more perfectly than any simple use of a straining-cloth would do. Preferably the cloth should be thick and large enough to let the streams of milk fall on it without much spattering, and it and the top-cover of netting-wire should and do retain all the spattering that otherwise would take place.

The dotted lines *e e* show the milk-pail, with its bail *i*, and the bail-ears *j*, and the hinge *g*, by which it is hinged to the pail.

By my device any coarse impurities falling on the upper or top cover are there retained and the spattering of the milk prevented. By the cloth the finer impurities are retained, and the cloth prevents much frothing of the milk as it falls on it. The lower wire-netting is a support of the cloth, and is a strainer, also, for any impurities, dust, or other articles that escape from the cloth. The sopping or mopping like action of the cloth is apparent, not only on the top of the cloth, but the milk that may run between the cloth and the concave cover is also thus cleared of impurities. By the whole the milk is kept clean and strained in the pail as soon as it enters the pail, removing even the finest dust, and the milk is ready to be used or emptied directly out of the pail into pans for the rising of the cream or other processes for which milk is used, and there is no standing of the milk on the impurities while in the pail.

In Fig. 2 the cloth $h$ is not shown in its place, as it would confuse the drawings; but its place is fully indicated in Fig. 1.

Other matters concerning my invention are apparent to those skilled in the art, to which it appertains.

I am aware that concave pans with apertures in their centers occupied by wire-netting, or made by holes punctured therein, have been long in use, with or without the use of cloths for strainers, in connection with the said pans and their central apertures and netting. These as thus used I do not claim; but What I do claim is—

The milk-pail cover described, made of the horizontal netting $a$, used to prevent spattering of milk, the pan $c$, with netted aperture $d$ at its center, and the cloth $h$, lying within the pan and over the aperture, the said parts being constructed and used in the manner and for the purposes set forth.

SOLOMON JUNE.

Witnesses:
S. J. PARKER,
O. P. HYDE.